(12) United States Patent
Kannan et al.

(10) Patent No.: US 9,379,899 B2
(45) Date of Patent: *Jun. 28, 2016

(54) MULTICAST ROUTING (71) Applicant: HEWLETT PACKARD ENTERPRISE DEVELOPMENT LP, Houston, TX (US)

(72) Inventors: Madhu Prashanth Kannan, Karnataka (IN); Christopher Sean Affleck, Roseville, CA (US); Aparna Anand, Karnataka (IN); Duane Edward Mentze, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/810,352

(22) Filed: Jul. 27, 2015

(65) Prior Publication Data

US 2015/0333921 A1 Nov. 19, 2015

Related U.S. Application Data

(63) Continuation of application No. 13/527,226, filed on Jun. 19, 2012, now Pat. No. 9,148,363.

(51) Int. Cl.
*H04L 12/18* (2006.01)
*H04L 12/761* (2013.01)
*H04L 12/741* (2013.01)
*G06F 15/173* (2006.01)

(52) U.S. Cl.
CPC ............... *H04L 12/18* (2013.01); *H04L 45/16* (2013.01); *H04L 45/54* (2013.01)

(58) Field of Classification Search
CPC ....... H04L 45/16; H04L 12/18; H04L 12/185; H04L 45/00; H04L 49/201
USPC .......................................... 370/390, 432, 351
See application file for complete search history.

(56) References Cited

U.S. PATENT DOCUMENTS

| | | | |
|---|---|---|---|
| 6,636,895 B1 * | 10/2003 | Li | H04L 45/02 370/351 |
| 6,791,980 B1 * | 9/2004 | Li | H04L 45/00 370/390 |
| 7,626,984 B2 | 12/2009 | Napierala | |
| 7,644,177 B2 * | 1/2010 | Kouvelas | H04L 12/18 709/228 |
| 7,716,363 B1 | 5/2010 | Eckert | |
| 7,830,787 B1 | 11/2010 | Wijnands et al. | |
| 8,099,483 B2 | 1/2012 | Smith et al. | |

(Continued)

OTHER PUBLICATIONS

IP Multicast Multicast Virtual Private Networks Concepts, Cisco Systems, Inc., White Paper, pp. 1-10, 1999-2002, Download date: May 21, 2012. http://www.cisco.com/en/US/tech.

*Primary Examiner* — Charles C Jiang
*Assistant Examiner* — Will Lin
(74) *Attorney, Agent, or Firm* — Mannava & Kang, P.C.

(57) ABSTRACT

A method for multicast routing may include receiving, at a router of a receiving multicast domain, a data packet from a forwarding multicast domain. The method may further include configuring the router to operate as if a multicast forwarding information base entry is directly connected, and configuring the router with a reverse path forwarding override with source discovery such that a path used by multicast traffic is different from a path used for unicast traffic.

14 Claims, 5 Drawing Sheets

(56) References Cited

U.S. PATENT DOCUMENTS

2004/0205215 A1* 10/2004 Kouvelas ............... H04L 12/18 709/231
2005/0074001 A1 4/2005 Mattes et al.
2005/0259672 A1 11/2005 Eduri
2013/0034097 A1* 2/2013 Dharmapurikar ..... H04L 45/026 370/390

* cited by examiner

MULTICAST ROUTING

PRIORITY CLAIM

This application is a Continuation of commonly assigned and copending U.S. patent application Ser.No. 13/527,226, filed Jun. 19, 2012, and entitled "MULTICAST ROUTING", which is incorporated by reference in its entirety.

BACKGROUND

In multicast routing, routing paths can be described in the form of trees that include a source or a rendezvous point (RP) at the root of a tree, branches formed by routers that separate routing paths, and leaves (i.e., receivers) that receive traffic. For a domain generally, since a tree may include multiple paths from a receiver to the root, once a path is generated, modifying the path can be challenging. Modifying a path can also be challenging when connecting different multicast domains. For example, once a router of a receiving multicast domain receives a packet from a forwarding multicast domain via a set path, traffic flow can be disrupted if the traffic is not appropriately routed by the receiving multicast domain.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Unicast routing includes forwarding traffic from a source to a specific destination address on an internetwork. In unicast routing, a routing decision as to the next hop in a path from the source to the specific destination is performed at each hop. Therefore, each router examines the destination address of an incoming packet and looks up the destination address to determine which interface to use on the next hop in order for that packet to be sent to the destination. Compared to unicast routing, for multicast routing, the source address is instead used to determine the direction of the data stream. In multicast routing, a router determines which downstream interfaces are destinations for a multicast group (i.e., the destination address), and sends a packet out via the appropriate interfaces.

In multicast routing, routing paths can be described in the form of trees that include a source or a RP at the root of a tree, branches formed by routers that separate routing paths, and leaves (i.e., receivers) that receive traffic. The RP is a router in a multicast domain that functions as a shared root for a multicast shared tree. The receivers may send a join toward the root of the tree to request traffic. The RP may receive a join and forward the join to a source, and any traffic sent by a source may be sent to the RP and distributed to the receivers. The traffic received by the receivers via the RP thus includes the source information. A path to the root of the tree may be built by using reverse path forwarding (RPF), which is used for the purpose of ensuring loop-free forwarding of multicast packets. RPF uses the unicast address of the root to determine the path from the receiver to the root. The multicast tree may thus be formed by multiple receivers sending joins toward the root and thus forming multiple paths to the root. Since the tree may include multiple paths from a receiver to the root, modifying a path, or in other words, altering the RPF based path to the root can be challenging.

For example, multicast routing protocols, such as the protocol independent multicast (PIM) family of routing protocols, may use RPF to help define the criteria for the protocol to accept incoming data packets. RPF lookup verifies that the incoming interface for a packet matches the unicast forwarding information base (FIB). PIM does not generally maintain a unicast routing database, but instead uses the FIB of a receiving router. The PIM multicast routing protocol is independent of the unicast routing protocol, but uses the FIB created by the unicast routing protocol for making RPF decisions. Situations can arise where the network has constraints as to which paths the unicast traffic and multicast traffic should traverse. Given that PIM uses the unicast FIB to determine incoming interfaces, this leads to an overlap of the unicast and multicast paths. In other words, the net result of the PIM RPF check using the unicast FIB is that unicast traffic destined to a particular address will traverse the same interface on the router as multicast traffic sourced from the same source.

Another aspect related to multicast routing includes routing multicast packets across routed interfaces of multicast domains. A multicast domain generally includes a set of routers whose RP address is known. If traffic from a forwarding multicast domain is sent to an edge router of a receiving multicast domain, the multicast forwarding information base (MFIB) component of the receiving multicast domain will allow the edge router to accept the flow on an interface independent of the unicast FIB. For example, the edge router of the receiving multicast domain may be provided with a RPF override to accept the traffic. However, the receiving multicast domain includes no other routers that have knowledge of the specific traffic flow. Since the source of the traffic is from the forwarding multicast domain and this source information is not known to the receiving multicast domain, the receiving edge router of the receiving multicast domain cannot forward the traffic. Thus, further flow of the received traffic can be disrupted if the traffic cannot be forwarded by the receiving edge router. For example, if the multicast routing protocol uses any-source mutlicast (ASM), the discovery of sources is necessary for non-flooding protocols such as PIM sparse mode (PIM-SM).

A multicast routing apparatus and method are described herein and generally provide for a multicast device, such as a router, to use techniques, such as, RPF overrides, for source discovery in order to permit the origination of new traffic into a multicast domain, where the desired path to the source is not congruent with the path used by unicast traffic. The use of RPF overrides provides for separation of the paths of unicast and multicast traffic. The use of RPF overrides can also eliminate the need for configuring and running additional protocols, such as inter-domain multicast source discovery protocol (MSDP). The apparatus and method also provide for source discovery (e.g., sending a register packet from the designated router (DR) to the RP as described below), which further allows for interoperation with multicast routers.

Figure 1:
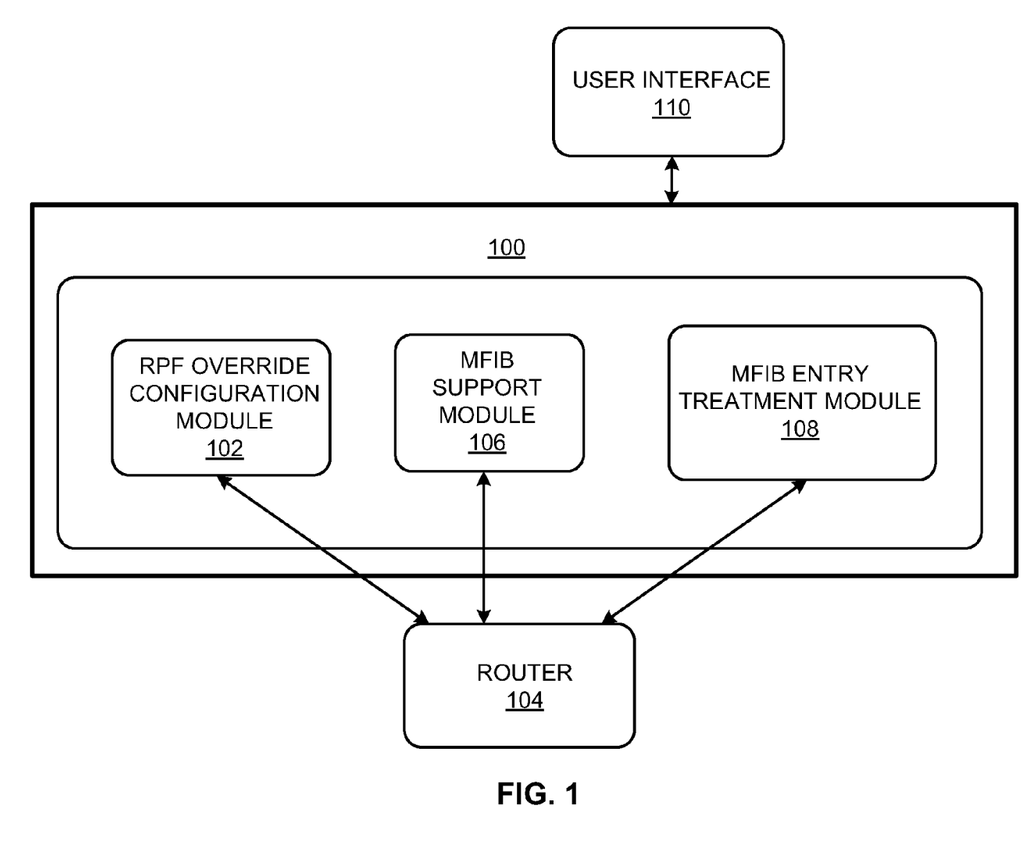
FIG. 1 illustrates an architecture of a multicast routing apparatus, according to an example of the present disclosure.

FIG. 1 illustrates an architecture of a multicast routing apparatus 100, according to an example. Referring to FIG. 1, the apparatus 100 is depicted as including a RPF override configuration module 102 to configure a router 104 of a multicast domain (e.g., the multicast domains of FIG. 2) with RPF override with source discovery. A MFIB support module 106 is to configure the router 104 such that a MFIB takes precedence over a FIB. A MFIB entry treatment module 108 is to configure the router 104 to operate as if a MFIB entry is directly connected (i.e., route distance of zero). A user interface 110 is to facilitate configuration of the router 104 via the modules 102, 106, and 108. The modules 102, 106, and 108 may be combined into a single router configuration module, and are described herein as separate modules to facilitate description of the functions thereof. The multicast routing apparatus 100 may be implemented in a router of a multicast domain. Alternatively, the multicast routing apparatus 100 may be implemented in a wired or wireless configuration with a router or a component of a multicast domain to control the functionality of a multicast domain.

The modules 102, 106, and 108, and other components of the apparatus 100 may comprise machine readable instructions stored on a computer readable medium. In addition, or alternatively, the modules 102, 106, and 108, and other components of the apparatus 100 may comprise hardware or a combination of machine readable instructions and hardware.

The RPF override configuration module 102 is to configure the router 104 of a multicast domain with RPF override with source discovery. In order to provide for RPF override configuration, the user interface 110 may be used to provide the router 104 with the RPF override information, as discussed below with reference to the example of FIG. 2. Alternatively, the RPF override information may be automatically provided to the router 104 based on predetermined RPF override information for a multicast domain. The user interface 110 may also be used to provide the router 104 with route information, such as, a subnet, a route metric, a next hop, a route distance, and a prefix length.

The MFIB support module 106 is to configure the router 104 such that a MFIB takes precedence over a FIB. The MFIB support module 106 provides a multicast routing protocol with the capability of using RPF override configuration information from the RPF override configuration module 102 by giving the RPF override information (i.e., the MFIB) precedence over the FIB information.

The MFIB entry treatment module 108 is to configure the router 104 such that a MFIB entry is determined to be directly connected (i.e., route distance of zero). Thus, the MFIB entry treatment module 108 provides support for a mutlicast route protocol to treat MFIB routes identically to FIB routes, such that data on MFIB routes with a distance of zero (i.e., distance between hops) is determined to be directly connected. A multicast routing protocol therefore accepts a MFIB entry for determining the next hop, and further accepts the route distance per the route metric and any preference information. The treatment of a MFIB entry identically to a FIB entry provides for MFIB entries to be candidates for sending source information to a RP.

The general operation of the multicast routing apparatus 100 is described.

In order for a receiving multicast domain to determine the new source for non-congruent paths for a data packet sent from a forwarding multicast domain, a MFIB entry may be configured with a distance of zero (i.e., directly connected) for a multicast traffic flow. The MFIB entry treatment module 108 may configure the router 104 (e.g., for a receiving multicast domain) such that a MFIB entry is determined to be directly connected. In response to the configuration, a RPF override route is added to the MFIB. The RPF override configuration module 102 may configure the router 104 to add a RPF override route to the MFIB. For a multicast data packet on an incoming interface (IIF) of the router 104, the MFIB support module 106 first checks the MFIB for a MFIB based matching route, and if the check fails, the MFIB support module 106 checks the FIB for a FIB based matching route. For the route that is found (i.e., the MFIB or FIB based route), the MFIB support module 106 determines if the IIF matches the next hop interface in the route, and if so, the MFIB support module 106 accepts the associated packet and determines if the route is directly connected. If the IIF does not match the next hop interface in the route, the MFIB support module 106 drops the associated data packet. If the MFIB support module 106 accepts the associated data packet, the MFIB entry treatment module 108 determines if the route is directly connected and further determines if the multicast routing protocol for the multicast domain has link responsibility for notification of new flows on the IIF. If the multicast routing protocol has link responsibility, then the multicast domain is notified of the new flow. For the example of the PIM-SM described below, this responsibility is provided by the DR. For example, as described in further detail with reference to the example of FIG. 2, the DR will send register packets (i.e., unicast tunneled data packets) to the RP for incoming data packets on an interface for which the device is the DR and for which a source is directly connected (i.e., has a route distance of zero). Thus, if it is determined that the router (e.g., the router 104) is a DR, the router tunnels the data packet to the RP by encapsulating the data packet to the RP. With the data packet sent to the RP, other receivers of the receiving multicast domain may now receive the data packet from the RP.

An example of operation of the multicast routing apparatus 100 is described based on application of the PIM-SM multicast routing protocol. The PIM-SM multicast routing protocol builds unidirectional shared trees rooted at a RP per group, and can create shortest-path trees per source. For PIM-SM, multiple trees may be used to route traffic, such as a source tree (i.e., shortest path tree (SPT)) or a rendezvous tree (i.e., RPT, RP tree). PIM join requests between routers for SPT typically include the source and group (i.e., sg). PIM join requests between routers for RPT typically include the group (i.e., *g), where '*' represents a wild card. For example, PIM-SM may use a shared tree called a RP tree that relies on a central router called the RP that receives traffic from a source and forwards that traffic to receivers. PIM-SM may also use source-based trees where a multicast source includes a corresponding multicast tree that directly connects the source to receivers. Source based trees include a sg entry with a list of outgoing interfaces, where s represents the source address and g represents the multicast group. Networks are generally configured for switching from *g to sg. However traffic is first delivered via the *g tree for *g joins. The *g tree obtains data directly from the source. This is done by the source unicast tunneling the traffic to the RP. However for multiple domains, since each domain has its own set of RPs, in order for *g subscriptions to work properly, knowledge of new sources is needed for each domain. The knowledge of new sources is also needed when creating non-congruent paths for unicast and multicast traffic.

An example using the PIM-SM multicast routing protocol for discovery of new sources is described with reference to FIG. 2.

Figure 2:
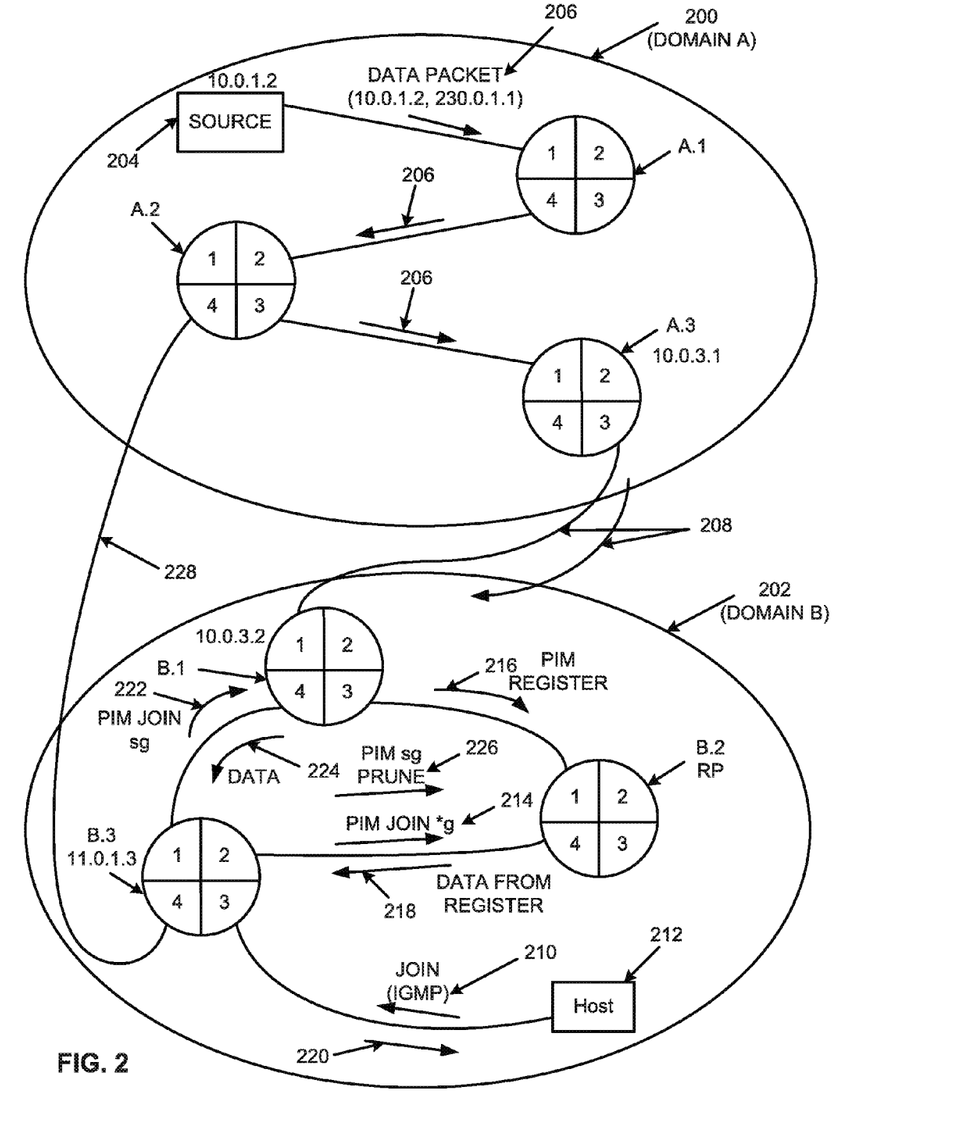
FIG. 2 illustrates an example of traffic flow between multicast domains, according to an example of the present disclosure.

Referring to FIG. 2, an example of traffic flow between multicast domains 200 and 202 is described. The domains 200 and 202 are referred to as domains A and B for facilitating the description thereof. The multicast domain A includes routers A.1, A.2 and A.3, and the multicast domain B includes routers B.1, B.2 and B.3. The router interfaces are designated such that for domain A, router 3 interface 2 is designated A.3.2, and other routers are designated similarly. The router interfaces for domain B are designated in a similar manner as the router interfaces for domain A.

Referring to domain A, a source 204 sends a data packet 206 that progresses through domain A via routers A.1, A.2 and A.3 and is flooded as shown at 208 into domain B at router B.1. The data arrives on the interface B.1.1 of the router B.1. This data stream has the source, for example, of 10.0.1.2 (i.e., the unicast IP address of the source 204) and destination, for example, of 230.0.1.1 (i.e., the multicast group).

Assuming the FIB for the router B.1 shows that to reach the source 204 (i.e., 10.0.1.2), the 10.0.1.0/24 route is reached via the next hop of the interface A.1.3 (e.g. 10.0.3.1), because the interface A.1.4 is on the interface B.1.2, the data packet 206 does not pass the RPF check for the router B.1 and is not routed. At 210, the router B.3 receives a join (e.g., internet group management protocol (IGMP)) on the interface B.3.3 for the multicast group 230.0.1.1 from a host 212, which may function as a receiver. In response to the join on the interface B.3.3, at 214, the router B.3 sends a *g PIM join to RP B.2 from the interface B.3.2 to the interface B.2.4. Since the RP B.2 has not seen any traffic for the multicast group 230.0.1.1, the RP B.2 cannot send any traffic to the router B.3.

Using, for example, the user interface 110, a RPF override entry is added for the router B.1. For example, the entry 'router pim rpf-override 10.0.1.2/32 10.0.3.2' is added to the router B.1. Since the next hop of 10.0.3.2 in the RPF override added to the router B.1 is actually the IP address of the interface B.1.1 (see FIG. 2), this indicates that the route is to be treated as a directly connected route (i.e., the route distance is 0). Further, a RPF override is added on the router B.3 as follows: 'router pim rpf-override 10.0.1.2/32 11.0.1.3'. For this example, the interface B.1.3 is assigned an IP address of 11.0.1.3. Incoming data packets on the interface B.1.1 will pass the RPF check in that the MFIB entry shows that data packets from 10.0.3.1 (i.e., the A.3 router) should come in on the interface B.1.1. Router B.3 will use the interface B.3.1 as the path towards the source. Previously, as shown at 228, the FIB route next hop to the source was between B.3.4 to A.2.4. For this example, the router B.1 also is the DR on interface 1 for domain B. This can be ensured by setting an administrative boundary on interface B.1.1 which causes it to not form a PIM neighbor adjacency with interface A.3.3.

At 216, the router B.1 sends register packets (i.e., tunneled data packets) from the source 204 to the RP (i.e., the router B.2), as multicast data packets from the source are received. At 218, the router B.2 routes these data packets 206 to the interface B.3.2. The router B.3 then routes these data packets 206 to the interface B.3.3. At 220, the data packets 206 are further routed to the host 212 from the interface B.3.3. At 222, the router B.3 also sends a PIM join sg to the interface B.1.4. At 224, the router B.1 routes the data packet 206 directly to the interface B.3.1 via the interface B.1.4. At 226, once the interface B.3.1 receives data directly from the source 204, it will prune off the *g join for the source 204, towards the interface B.2.4. At this point, the SPT tree path has been built from the source 204 in domain A to the router B.1 in domain B using a RPF overridden path.

Figure 3:
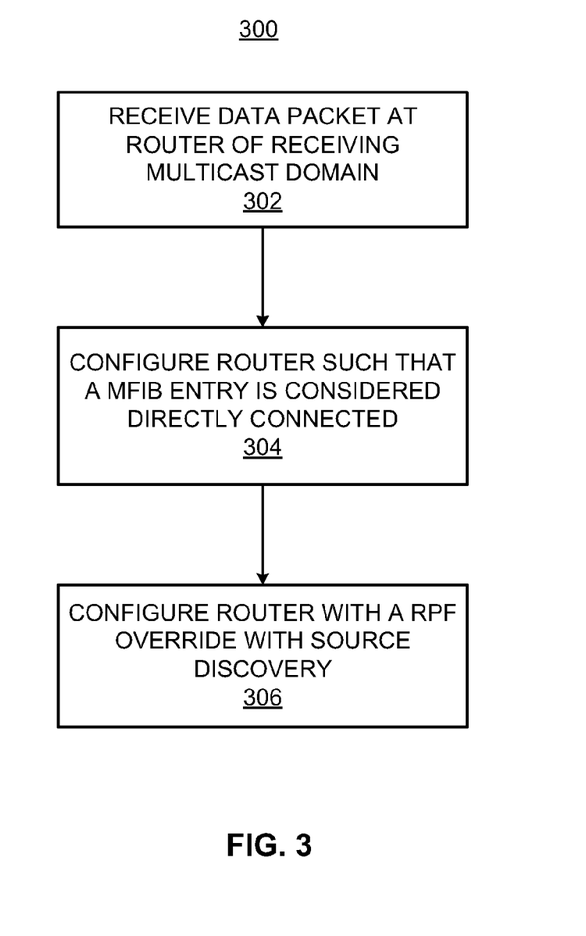
FIG. 3 illustrates a method for multicast routing, according to an example of the present disclosure.
Figure 4:
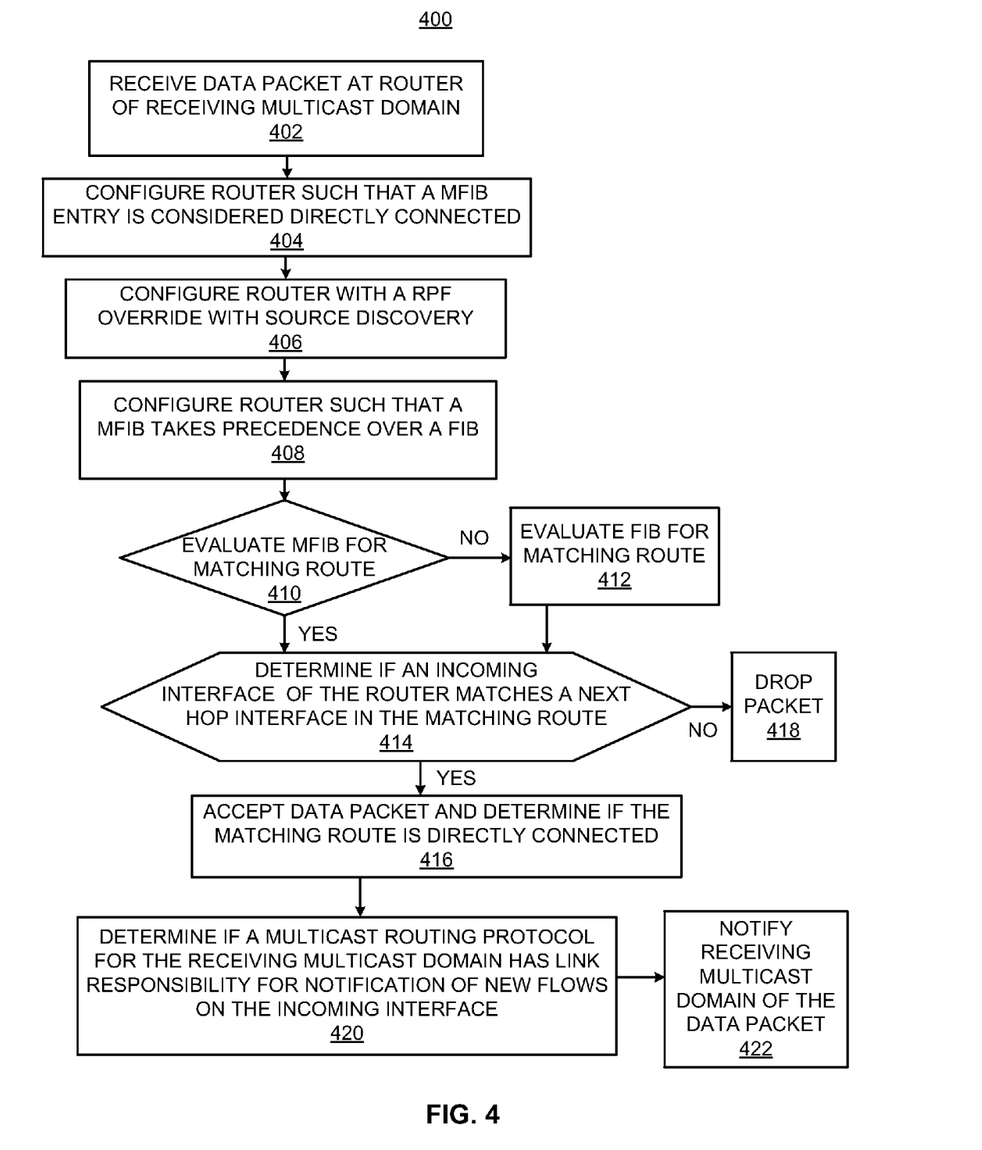
FIG. 4 illustrates further details of the method for multicast routing, according to an example of the present disclosure.

FIGS. 3 and 4 illustrate flowcharts of methods 300 and 400 for multicast routing, corresponding to the example of the multicast routing apparatus 100 whose construction is described in detail above. The methods 300 and 400 may be implemented on the multicast routing apparatus 100 with reference to FIG. 1 by way of example and not limitation. The methods 300 and 400 may be practiced in other apparatus.

Referring to FIG. 3, for the method 300, at block 302, a router of a receiving multicast domain receives a data packet from a forwarding multicast domain. For example, referring to FIG. 1, the router 104 of a receiving multicast domain (e.g., multicast domain 202 for the example of FIG. 2) receives a data packet from a forwarding multicast domain (multicast domain 200 for the example of FIG. 2).

At block 304, the router is configured such that a MFIB entry is determined to be directly connected. For example, referring to FIG. 1, the MFIB entry treatment module 108 is to configure the router 104 such that a MFIB entry is determined to be directly connected (i.e., route distance of zero).

At block 306, the router is configured with a RPF override with source discovery such that a path used by multicast traffic is different from a path used for unicast traffic. For example, referring to FIG. 1, the RPF override configuration module 102 is to configure the router 104 with RPF override with source discovery.

Referring to FIG. 4, for the method 400, at block 402, a router of a receiving multicast domain receives a data packet from a forwarding multicast domain.

At block 404, the router is configured such that a MFIB entry is determined to be directly connected. For example, the MFIB entry is determined to be directly connected when data on a MFIB route has a distance of zero.

At block 406, the router is configured with a RPF override with source discovery such that a path used by multicast traffic is different from a path used for unicast traffic.

At block 408, the router is configured such that a MFIB takes precedence over a FIB. For example, referring to FIG. 1, the MFIB support module 106 is to configure the router 104 such that a MFIB takes precedence over a FIB.

At block 410, the MFIB is evaluated for a matching route.

At block 412, If the MFIB does not include the matching route, then the FIB is evaluated for the matching route.

At block 414, for the matching route located by evaluating the MFIB or the FIB, a determination is made if an incoming interface of the router matches a next hop interface in the matching route.

At block 416, if the incoming interface of the router matches the next hop interface in the matching route, the data packet is accepted and a determination is made if the matching route is directly connected. If the route is not directly connected, then the data packet will not be tunneled to the RP.

At block 418, if the incoming interface of the router does not match the next hop interface in the matching route, the data packet is dropped.

At block 420, if the matching route is directly connected, a determination is made if a multicast routing protocol for the receiving multicast domain has link responsibility for notification of new flows on the incoming interface. If the router is not the DR on the incoming interface, then the router will not tunnel the data packet to the RP.

At block 422, if the multicast routing protocol for the receiving multicast domain has link responsibility for notification of new flows on the incoming interface, the receiving multicast domain is notified of the data packet.

Figure 5:
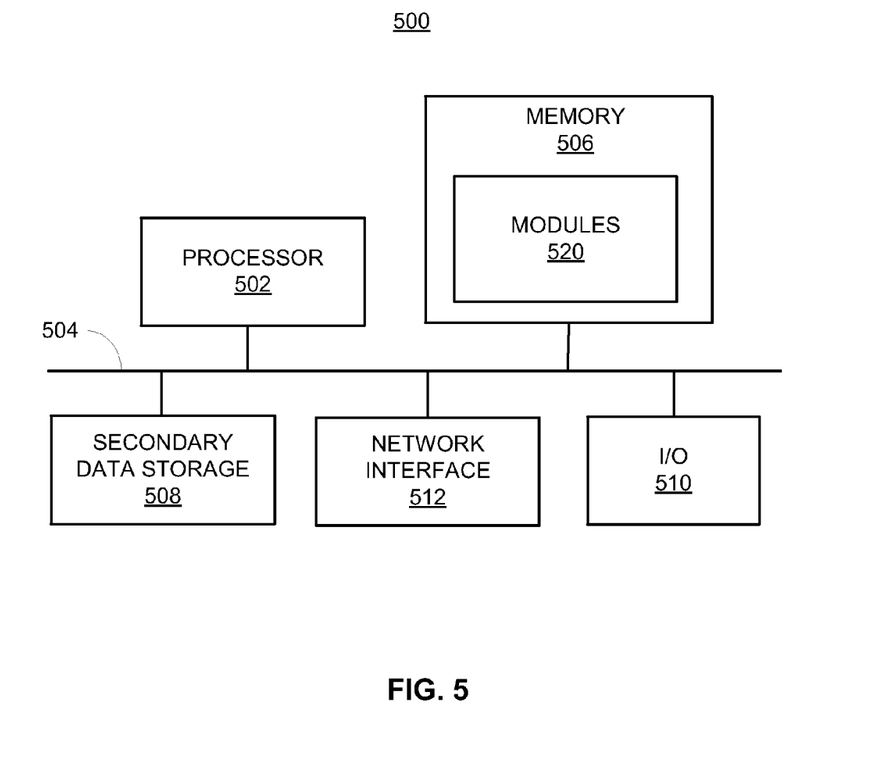
FIG. 5 illustrates a computer system, according to an example of the present disclosure.

FIG. 5 shows a computer system that may be used with the examples described herein. The computer system represents a generic platform that includes components that may be in a server or another computer system. The computer system may be used as a platform for the apparatus 100. The computer system may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system includes a processor 502 that may implement or execute machine readable instructions performing some or all of the methods, functions and other processes described herein. Commands and data from the processor 502 are communicated over a communication bus 504. The computer system also includes a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include modules 520 including machine readable instructions residing in the memory 506 during runtime and executed by the processor 502. The modules 520 may include the modules 102, 106 and 108 of the apparatus shown in FIG. 1.

The computer system may include an I/O device 510, such as a keyboard, a mouse, a display, etc. The computer system may include a network interface 512 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for routing, the method comprising:
   receiving, at a router of a receiving multicast domain, a data packet from a forwarding multicast domain;
   configuring the router to operate as if a multicast forwarding information base entry is directly connected to the router; and
   configuring, by a processor, the router with a reverse path forwarding override with source discovery, wherein a path used by multicast traffic is different from a path used for unicast traffic.

2. The method of claim 1, wherein the router is to operate as if the multicast forwarding information base entry is directly connected to the router when data on a multicast forwarding information base route has a distance of zero.

3. The method of claim 1, further comprising:
   evaluating a multicast forwarding information base associated with the router for a matching route; and
   if the multicast forwarding information base does not include the matching route, evaluating a forwarding information base associated with the router for the matching route.

4. The method of claim 3, wherein for the matching route located by evaluating the multicast forwarding information base or the forwarding information base, the method further comprising:
   determining if an incoming interface of the router matches a next hop interface in the matching route.

5. The method of claim 4, wherein if the incoming interface of the router matches the next hop interface in the matching route, the method further comprising:
   accepting the data packet; and
   determining if the matching route is directly connected to the router.

6. The method of claim 4, wherein if the incoming interface of the router does not match the next hop interface in the matching route, the method further comprising:
   dropping the data packet.

7. The method of claim 5, wherein if the matching route is directly connected to the router, the method further comprising:
   determining if a multicast routing protocol for the receiving multicast domain has link responsibility for notification of new flows on the incoming interface.

8. The method of claim 7, wherein if the multicast routing protocol for the receiving multicast domain has link responsibility for notification of new flows on the incoming interface, the method further comprising:
   notifying the receiving multicast domain of the data packet.

9. The method of claim 7, wherein if the multicast routing protocol for the receiving multicast domain has link responsibility for notification of new flows on the incoming interface, for protocol independent multicast sparse mode, the method further comprising:
   notifying a rendezvous point of the receiving multicast domain of the data packet.

10. A routing apparatus comprising:
    a memory comprising machine readable instructions to:
       configure a router of a multicast domain to operate as if a multicast forwarding information base entry is directly connected to the router;
       configure the router with a reverse path forwarding override with source discovery, wherein a path used by multicast traffic is different from a path used for unicast traffic;
       selectively evaluate, for the router, a multicast forwarding information base or a forwarding information base for a matching route; and
       determine, for the matching route, if an incoming interface of the router matches a next hop interface in the matching route; and
    a processor to implement the machine readable instructions.

11. The routing apparatus of claim 10, wherein if the incoming interface of the router matches the next hop interface in the matching route, the memory further comprises machine readable instructions to:
    accept a data packet received by the router;
    determine if the matching route is directly connected to the router;

if the matching route is directly connected to the router, determine if a multicast routing protocol for the multicast domain has link responsibility for notification of new flows on the incoming interface; and if the multicast routing protocol for the multicast domain has link responsibility for notification of new flows on the incoming interface, notify a receiving multicast domain of the data packet.

12. A non-transitory computer readable medium having stored thereon machine readable instructions for routing, the machine readable instructions when executed cause a computer system to:

configure a router of a multicast domain, wherein a multicast forwarding information base takes precedence over a forwarding information base;

configure the router to operate as if a multicast forwarding information base entry is directly connected to the router when data on a multicast forwarding information base route has a distance of zero; and configure, by a processor, the router with a reverse path forwarding override with source discovery, wherein a path used by multicast traffic is different from a path used for unicast traffic.

13. The non-transitory computer readable medium of claim 12, the machine readable instructions when executed further cause the computer system to:

evaluate the multicast forwarding information base for a matching route;

if the multicast forwarding information base does not include the matching route, evaluate the forwarding information base for the matching route; and for the matching route located by evaluating the multicast forwarding information base or the forwarding information base, determine if an incoming interface of the router matches a next hop interface in the matching route.

14. The non-transitory computer readable medium of claim 13, wherein if the incoming interface of the router matches the next hop interface in the matching route, the machine readable instructions when executed further cause the computer system to:

accept a data packet; and determine if the matching route is directly connected to the router.

* * * * *